G. DRIES.
PACKING GLAND.
APPLICATION FILED OCT. 18, 1913.
1,188,419.
Patented June 27, 1916.
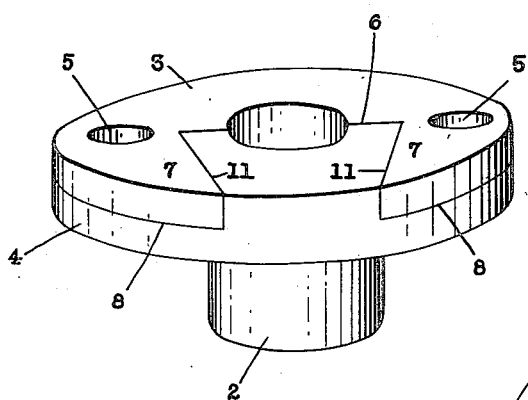
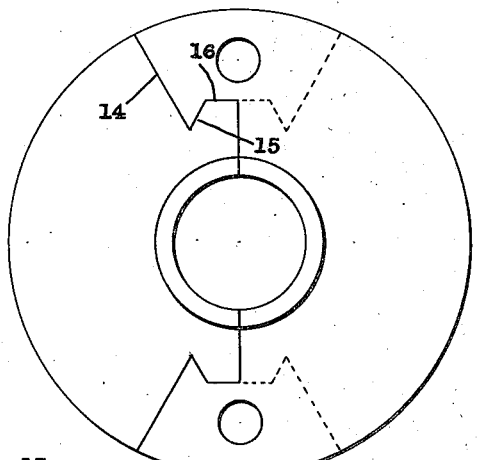
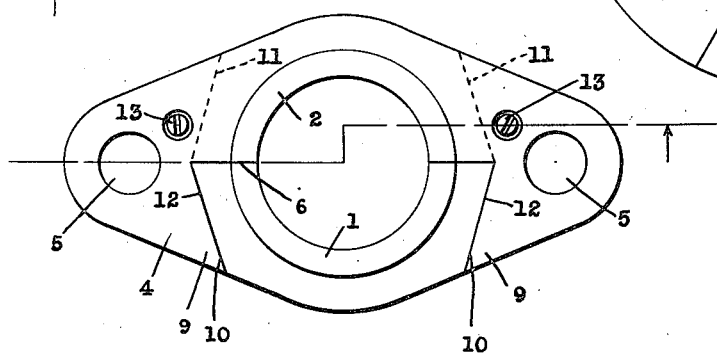
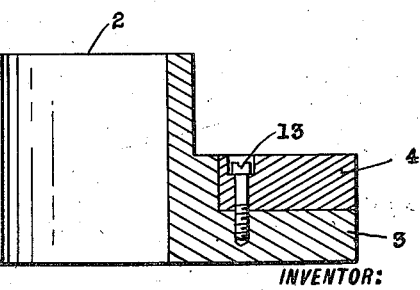
WITNESSES:
Howard P. King.
Mildred E. Brooks.
INVENTOR:
Gottfried Dries,
BY Russell M. Everett,
ATTORNEY.

UNITED STATES PATENT OFFICE.

GOTTFRIED DRIES, OF NEWARK, NEW JERSEY.

PACKING-GLAND.

1,188,419.  Specification of Letters Patent.  Patented June 27, 1916.

Application filed October 18, 1913. Serial No. 795,867.

*To all whom it may concern:*

Be it known that I, GOTTFRIED DRIES, a citizen of the United States, and a resident of Newark, in the county of Essex and State of New Jersey, have invented certain new and useful Improvements in Packing-Glands, of which the following is a specification.

The objects of this invention are to provide a sectional packing gland in which the sections cannot normally separate and alter the shape of or enlarge the central aperture through which a slidable pump rod or other movable member reciprocates; to thus promote a tight joint or packing; to provide for removal of said gland from the pump rod or other member by sliding one of said sections longitudinally of said member to disengage the sections; to apply the invention to the several forms of glands required for various purposes and with varied number of bolt holes; to procure exact registration of the sections; to hold said sections together independent of the bolts or studs used to maintain the gland in operative position; to secure simplicity of construction and operation, and to obtain other advantages and results as may be brought out in the following description.

Referring to the accompanying drawings, in which like numerals of reference indicate the same parts throughout the several views, Figure 1 is a perspective view of one form of gland embodying my invention; Fig. 2 is a face view of the same looking at the under side of the gland as shown in Fig. 1; Fig. 3 is a sectional view taken on the broken line A—A of Fig. 2, looking in the direction indicated by the arrow, and Fig. 4 is a face view, similar to Fig. 2, of a modified form of my invention applied to a circular gland.

In the specific embodiment of the invention illustrated in said drawings, a packing gland is shown providing a tubular or sleeve portion with a flange, projecting from one end thereof, the sleeve being split longitudinally and the flange portions carried by the two sections of the sleeve adapted to interlock with each other. In the particular interlocking construction which I have shown, the flange portion of one sleeve section is provided at its ends and for one half of its thickness with tongues having adjacent walls with converging or approaching portions which tongues are adapted to fit into correspondingly shaped recesses in the flange of the other sleeve section, said other sleeve section having at its ends and for the other half of its thickness other tongues with adjacent converging or approaching edge portions adapted to fit correspondingly recesses in the first-mentioned flange section. The sleeve sections are therefore dove-tailed together by the flange portions and cannot separate except by sliding longitudinally with respect to each other. Preferably a screw or the like extends from the tongue of one flange into the other flange, to prevent inadvertent separation of the sleeve sections during transportation, storage and so forth, and consequent inconvenience or damage to the sections, and if desired a plurality of such screws can be employed. Holes may be provided in the flange of the gland, to any desired number and in any desired arrangement, to receive the usual bolts or studs for securing the gland in place.

In Figs. 1, 2 and 3 of the drawings I have shown a gland with sleeve sections 1, 2 and flange portions 3, 4 forming together a flange of the ordinary and well-known elongated type having at its ends the bolt or stud holes 5, 5. The sleeve sections are divided upon a plane extending longitudinally of the flange portion, as at 6, and the tongues 7, 7 of the flange portion 3 enter recesses 8, 8 in the other flange portion 4 while the tongues 9, 9 on said other flange portion enter recesses 10, 10 in the first-mentioned flange portion 3. The adjacent edges of each pair of tongues converge upon planes 11, 11, or 12, 12, and as the recesses are correspondingly shaped, the desired interlocking is secured. In said Figs. 1-3 inclusive, 13, 13 indicate screws, preferably fillister head screws, which I have shown detachably holding the gland sections together.

In Fig. 4 I have shown a gland having a circular flange, the tongues of whose portions have their facing edges shaped as at 14, 15, 16, the parts 15 of said edges converging so as to lock the gland sections together. Obviously the facing edges of the tongues might be otherwise shaped if desired, and obviously the flange may be of any desired shape and provided with any desired number of bolt or stud holes. The gland may furthermore be divided into more sections than two if desired and these sections connected according to my invention.

In operation, first one section of the gland is placed on the pump rod or other movable member and then the other section is placed on the rod as near as possible to the first section. Then by sliding one section toward the other, the dovetail members slide together and prevent the sections of the gland from spreading radially of the pump rod. In other words, the central aperture through which the pump rod extends necessarily remains cylindrical and cannot spread at all to loosen the joint. The only possible way for the sections to separate is longitudinally of the pump rod, and when they are assembled and bolted in operative position such movement is positively prevented.

The facing edges of the tongues, which I have described as converging or approaching each other transversely of the sleeve or in the plane of the flange, are substantially perpendicular to said flange, so that there is never any obstruction to movement of the sections toward and away from each other longitudinally of the sleeve. Thus the bolts or studs for the gland can freely clamp the sections together, and yet at the same time there can be no tendency of the gland sections to spread or separate radially. All the advantages of a solid or one-piece gland are secured, therefore, as well as the convenience of having the gland in sections.

Having thus described the invention, what I claim is:

A packing gland comprising a flanged sleeve split longitudinally of itself each flange portion having at the extremities of its split edge a pair of tongues projecting in the plane of the flange across the plane of splitting and adapted to extend into corresponding recesses in the other flange portion, the inner facing edges of said tongues having portions which converge longitudinally of said edges in the plane of the flange and the other flange portion having correspondingly diverging walls of its recesses adapted to fit against said converging edge portions of the tongues when the sections are together, the ends of the split flange portions having bolt holes in alinement with said plane of splitting, whereby the sections into which the flanged sleeve are split are prevented from separating in a direction transverse to the plane of splitting and the said bolt holes in the ends of the flange portions extend through entire portions thereof.

GOTTFRIED DRIES.

Witnesses:
 HOWARD P. KING,
 JANET A. AYERS.